April 27, 1926.

J. H. WAGENHORST 1,582,494

RIM AND FELLY

Filed April 2, 1921    2 Sheets-Sheet 1

Inventor
J. H. Wagenhorst,
By Hull Brock & West
Attys.

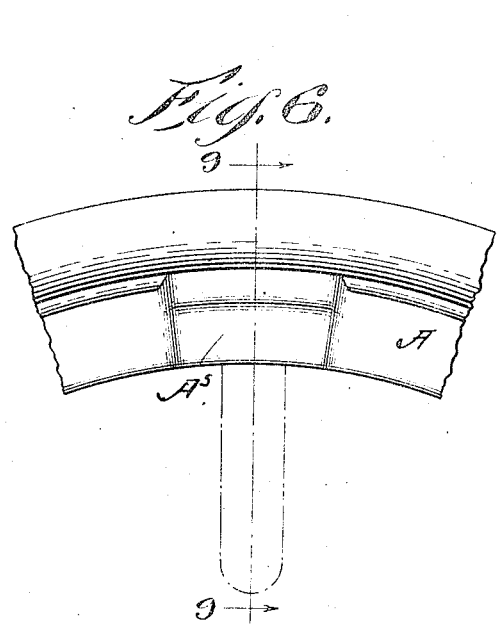
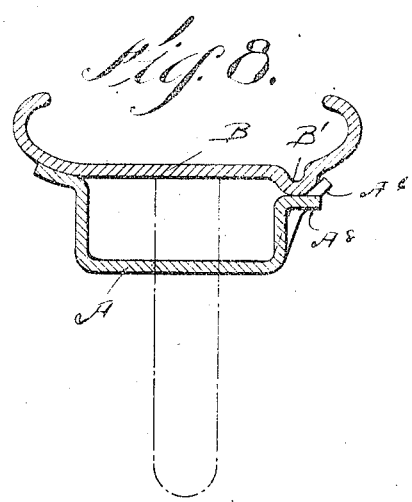
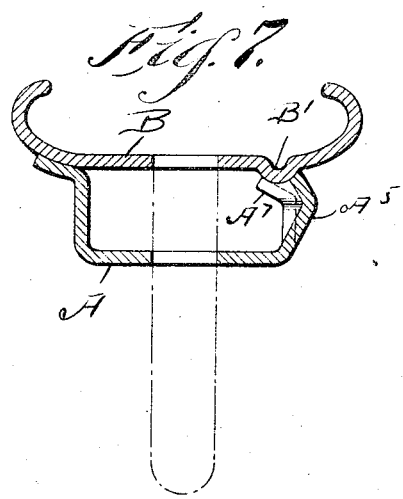
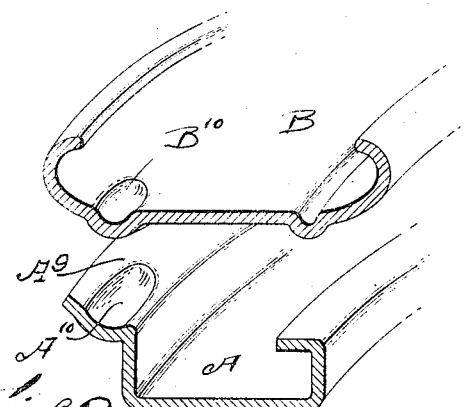

Patented Apr. 27, 1926.

1,582,494

UNITED STATES PATENT OFFICE.

JAMES H. WAGENHORST, OF JACKSON, MICHIGAN.

RIM AND FELLY.

Application filed April 2, 1921. Serial No. 458,006.

*To all whom it may concern:*

Be it known that I, JAMES H. WAGENHORST, a citizen of the United States, residing at Jackson, in the county of Jackson and State of Michigan, have invented a certain new and useful Improvement in Rims and Fellies, of which the following is a full, clear, and exact description, reference being had to the accompanying drawings.

This invention relates generally to automobile wheels and more particularly to certain improvements pertaining to the demountable tire carrying rim applied to said wheels and to the means for securing said rims upon the wheel body.

One object of the invention is to simplify the structures now in common use and another object is to elminate one or more fastening bolts and a still further object is to provide improved driving connections between the demountable tire carrying rim and wheel body.

Figure 1:
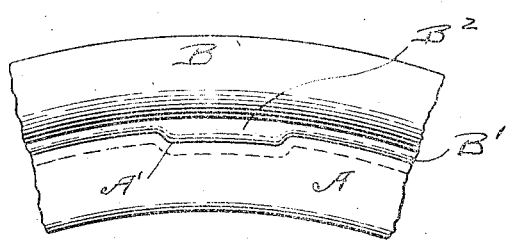
Figure 2:
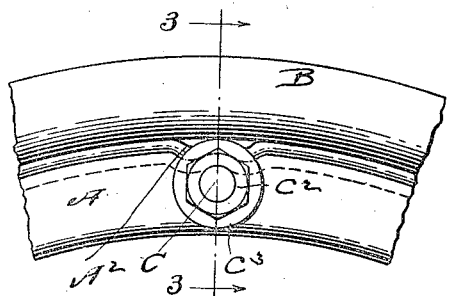
Figure 3:
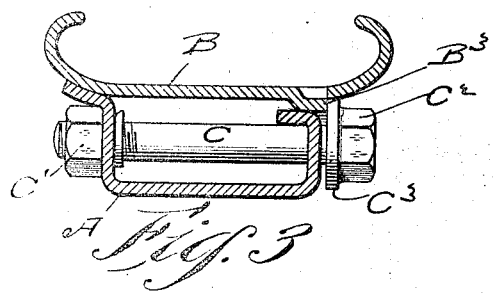
Figure 4:
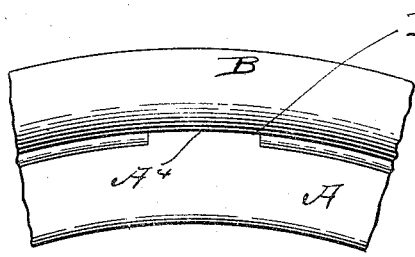
Figure 5:
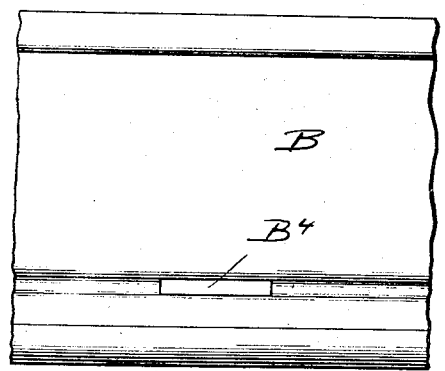

In the drawings forming a part of this specification, Fig. 1 is a side elevation of a portion of a demountable tire carrying rim and also a portion of the fixed rim of the wheel body; Fig. 2 is a face view of a portion of a demountable rim and likewise a portion of the fixed rim together with means for fastening the demountable rim upon the fixed rim; Fig. 3 is a detail sectional view on the line 3—3 of Fig. 2; Fig. 4 is a face view showing slightly modified forms of demountable and fixed rims; Fig. 5 is a plan view of the demountable rim shown in Fig. 4; Fig. 6 is a face view showing a portion of a modified form of fixed rim whereby one of the fastening bolts can be eliminated; Fig. 7 is a detail sectional view on the line 9—9 of Fig. 6; and Fig. 8 is a similar view showing a slight modification, and Fig. 9 another modification.

Referring to the drawings A in Fig. 1 indicates a fixed rim which is preferably of sheet metal and channeled and at definite points the flange of the front leg is recessed or notched or pressed inwardly as indicated at $A'$. The demountable tire carrying rim B is formed with an inwardly projecting bead $B'$ and at definite intervals this bead is extended radially inward as indicated at $B^2$, said inwardly extending portion corresponding substantially to the impressed or recessed portion of the fixed rim as shown at $A'$ and is adapted to fit therein thereby making a connection between the fixed and demountable rims which would prevent circumferential movement and thus provide a driving connection between the fixed and demountable rims.

At the points where the transverse bolts C pass through the front flange the fixed rim is depressed at $A^2$ on each side of the bolt opening and the bead is punched out as indicated at $B^3$ in Fig. 3 for the purpose of engagement with the collar $C^3$ upon the head $C^2$ of the bolt C, said bolt being threaded into a nut $C'$ arranged upon the rear side of the fixed rim. It will be understood that when the bolt is drawn up the collar of the head will contact with the portion $B^3$ and force the demountable tire carrying rim laterally and thereby firmly fasten said demountable rim upon the fixed rim, and by making the notches on opposite sides of the bolt I am able to place the bolt much closer to the outer edge of the front flange of the fixed rim and consequently get the benefit of a direct pull from the bolt.

In Fig. 4 the fixed rim is formed with an outwardly extending portion $A^4$ at definite intervals and the demountable rim B has the inwardly projecting rib or bead removed at definite intervals as indicated at $B^4$ in order to receive the outwardly projecting portion of the fixed rim thereby providing a driving connection between the fixed and demountable rims and preventing circumferential movement of the demountable rim.

In Figs. 6, 7 and 8 I have shown a slightly modified form of fixed rim by means of which one of the fastening bolts with nut thereon is eliminated, this modification occuring substantially opposite the valve stem extending through the demountable tire carrying rim and by referring to Figs. 6, 7, 8 it will be noted that the front leg of said rim is pressed forwardly as indicated at $A^5$ in Figs. 6 and 7 and $A^6$ in Fig. 8. In the construction shown in Figs. 6 and 7 the rim is provided with an inwardly projecting flange $A^7$ whereas in Fig. 8 it is formed with a forwardly projecting flange $A^8$ and against which the inwardly projecting rib or bead $B'$ of a demountable tire carrying rim contacts and by pressing the front leg forwardly as indicated so that its outer edge will contact with the front portion of the rib or bead, I am able to provide an abutment for the demountable tire carrying rim at this point to prevent lateral movement thereof and thereby eliminate the felly bolt at this point.

In Fig. 9 I have shown a slight modification of a driving connection in which the inner flange $A^9$ of the fixed rim A is formed with a depression $A^{10}$ and the demountable tire carrying rim B is formed with a corresponding portion $B^{10}$ adjacent its inner side and which fits into the depression $A^{10}$ thereby holding the demountable rim against circumferential movement and providing a suitable driving connection between the fixed and demountable rims.

It will thus be seen that I provide various forms of driving connections between the fixed and demountable rims said demountable rims being provided with an inwardly projecting rib or bead at the front side thereof and it will also be seen that I provide a novel construction of fixed rim whereby one of the transverse fastening bolts with nut thereon can be eliminated.

Having thus described my invention, what I claim is:

1. The combination with a fixed rim having legs, the front leg being sprung forwardly opposite the valve stem hole, of a tire carrying rim having an inwardly projecting bead, adapted to contact with the front leg of said fixed rim, the forwardly sprung portion of said leg engaging the demountable rim in front of the inwardly projecting bead.

2. The combination with a channeled fixed rim, flanges carried by the legs of said fixed rim, one of said flanges having depressions produced therein, of a demountable tire carrying rim adapted to fit upon the fixed rim, said tire carrying rim having depressions adapted to engage the depressions in the flange of the fixed rim.

3. The combination with a channeled fixed rim having differential legs, a securing bolt carried by said fixed rim, the outer portion of the front leg of said fixed rim being depressed adjacent said bolt, a demountable rim seated on said fixed rim and having an inwardly-projecting bead at its front side, a portion of said bead being pressed inwardly and fitting the depressed portion of the front leg, and a member on said bolt engaging said inwardly pressed portion of the bead to retain the demountable rim on the fixed rim.

4. The combination of a fixed rim having differential legs and a demountable rim having an inwardly-projecting bead, a portion of the front leg of said fixed rim being pressed forwardly and formed to provide a tongue engaging the front of said bead.

5. The combination of a demountable rim having an inwardly-projecting bead at its front side and a channeled fixed rim having differential legs, the front leg being sprung forwardly adjacent the valve stem hole to provide a portion engaging the demountable rim outside of the inner line of said bead.

In testimony whereof, I hereunto affix my signature.

JAMES H. WAGENHORST.